(12) United States Patent  
Penner (10) Patent No.: US 8,950,564 B1  
(45) Date of Patent: Feb. 10, 2015

(54) TRANSMISSION BRAKE DISENGAGEMENT SWITCH AND METHOD OF OPERATION

(76) Inventor: Ernest Peter Penner, Morris (CA)

( * ) Notice: Subject to any disclaimer, the term of this patent is extended or adjusted under 35 U.S.C. 154(b) by 226 days.

(21) Appl. No.: 13/593,574

(22) Filed: Aug. 24, 2012

Related U.S. Application Data

(60) Provisional application No. 61/526,846, filed on Aug. 24, 2011.

(51) Int. Cl.
  *B60T 7/08* (2006.01)
  *F16H 63/34* (2006.01)
  *F16D 63/00* (2006.01)

(52) U.S. Cl.
  CPC ........................................ *F16D 63/00* (2013.01)
  USPC ........................................... 192/221; 200/342

(58) Field of Classification Search
  CPC ................................................ B60Y 2200/114
  USPC ........................ 192/218; 200/33 B, 33 D, 342
  See application file for complete search history.

(56) References Cited

U.S. PATENT DOCUMENTS

| | | | | |
|---|---|---|---|---|
| 6,050,384 A | * | 4/2000 | Hammond | 192/221 |
| 7,344,012 B2 | * | 3/2008 | Ward et al. | 192/218 |
| 7,923,652 B1 | * | 4/2011 | Beck | 200/332.2 |
| 2012/0272775 A1 | * | 11/2012 | Boyd | 74/491 |

* cited by examiner

*Primary Examiner* — Richard Lorence
(74) *Attorney, Agent, or Firm* — Kyle R. Satterthwaite; Ryan W. Dupuis; Ade & Company Inc.

(57) ABSTRACT

Controls for a transmission brake include a switch that employs resistance to motion of an axially movable plunger in order to provide tactile feedback to the operator as to the current position of the plunger, thus reflecting a particular state of the switch. In a fully depressed position of the plunger, the transmission brake is on. Shortly before this position is reached, resistance is encountered at an intermediate position at which the transmission brake is already engaged, thereby giving the user of the option of depressing the plunger further in order to provide a longer travel time of plunger back to its normal spring-biased position in which the brake is disengaged. Some embodiments activate other brake control components at partially depressed plunger positions preceding the intermediate position, whereby controlled creeping of the vehicle can be accomplished before the transmission brake is returned to a continuously engaged state.

19 Claims, 6 Drawing Sheets

TRANSMISSION BRAKE DISENGAGEMENT SWITCH AND METHOD OF OPERATION

CROSS REFERENCE TO RELATED APPLICATIONS

This application claims benefit under 35 U.S.C. 119(e) of U.S. Provisional Patent Application Ser. No. 61/526,846, filed Aug. 24, 2011.

FIELD OF THE INVENTION

The present invention relates to a transmission brake disengagement switch for mounting on a drag race car and more particularly, to a method of activating and deactivating a transmission brake of a drag race car and a transmission brake disengagement apparatus having a mechanical actuation switch for providing an electrical signal to effect the disengagement of an electrically activated transmission brake of a drag race car.

BACKGROUND OF THE INVENTION

In the profession of drag racing, drivers strive to cover a fixed distance in a preselected time and the difference between winning and losing a race is often measured in thousandths of a second. Accordingly, the nature of a drag race places importance on the consistency of operation of the mechanisms of the car and the consistency of the reaction time of the driver with the result that getting off to a near perfect start being a matter of extreme importance to race car drivers.

In one form of drag racing, cars may cross the starting line only after the green light or starting light comes on. If the car crosses the starting line prior to the green light, the driver is said to have "red lighted" and automatically loses. Conventional drag race cars are equipped with a transmission brake which comprises a solenoid which when energized holds the car at the starting line thereby allowing the driver to apply high RMP of the engine of the car prior to the start of the race and to maintain the engine at or near maximum power until the solenoid is de-energized.

Typically, the start of a drag race is first initiated by a series of yellow lights which are illuminated in sequence with each light being illuminated for five-tenths of a second before the green light appears. Thus, the driver of a drag race car is in a position to judge the time the green light will illuminate and react by releasing an electro-mechanical starting switch which the driver has been holding down by use of continuous hand pressure to electronically disengage the transmission brake. Upon disengagement of the transmission brake, the car will accelerate down the track.

In order to achieve an ideal start reaction time, taking into account all of the variables involved, such as:
1) The rollout distance which can differ from:
   a) racetrack to racetrack;
   b) left lane to right lane;
   c) day to day due to race organization checking and resetting/adjusting/calibrating the rollout distance.
2) Brightness of the light bulbs which translates to response time of the driver to react to the first sight of the bulb coming on, which can differ by:
   a) type of bulbs used ie: incandescent vs. LED bulbs;
   b) intensity of the bulbs which is adjustable by the timing control system;
   c) the outside lighting conditions varying from bright and sunny to nighttime darkness. As well as direct sunlight shining on the bulbs depending on racetrack North, East, South or West orientation and time of day;
3) The actual response time and accuracy repeatability of the sensors of the timing system which can differ due to:
   a) brand name of sensors; and
   b) manufacturing quality control of the brand.

The requirement for an adjustable switch (that is within the legal description of the rules) that allows the driver to adjust the delay time ranging from extremely rapid release time to maximum delay time that can be accomplished following the guidelines of the rule limitation maximum of 3-inch length is necessary due to all the variables listed above and allows the driver to place himself in the position to attain an ideal start reaction time.

Unfortunately the setting of the amount of delay of a conventional switch has to be completed prior to entering the staging positions as the driver does not have the time available to make a mechanical adjustment. In race conditions, situations can occur when the driver has a need for an instantaneous choice for a $2^{nd}$ stage of additional delay available on demand. These situations occur in the event of:
   a) accidentally staging too deep, and hence there is less time or rollout available;
   b) last minute lane to lane switching forcing the driver to race in a lane that may have a shorter rollout;
   c) dusk to nighttime darkness advancing quicker than anticipated making it necessary for more delay.
all of which would result in a red light start and an instant loss.

It is therefore desirable to provide dual 2 stage differential release delayed timing, available instantaneously on demand, but not limited to 2 stages, in addition to delay adjustability in the more conventional method of a moveable travel stop.

SUMMARY OF THE INVENTION

According to a first aspect of the invention there is provided a transmission brake control switch comprising:

a switch device operable to open and close a conductive path between connection points at which the switch is connectable in a control circuit of a transmission brake in a manner such that opening and closing of the conductive path switches the transmission brake between on and off states, the switch comprising a plunger supported for movement along an axis thereof between a normal position into which it is biased and a depressed position in which the transmission brake is in the on state; and a resistance mechanism operable to impede movement of the movement of the plunger toward the depressed position from the normal position upon reaching an intermediate position between the depressed and normal positions;

wherein the plunger is arranged to put the conductive path of the switch device into a same one of an open or closed state at the intermediate and depressed positions, and put the conductive path of the switch into the other of the open or closed state at the normal position.

Preferably the switch device has a first contact element movable into and out of contact with a second contact element to open and close the conductive path, the first contact element is biased against the plunger in a direction moving the first contact element out of contact with the second contact element, and the plunger has a smaller diameter portion against which the first contact element abuts in the normal position and a larger diameter portion against which the first contact element abuts in the depressed position Preferably the plunger is rotatable about its axis and the resistance mechanism comprises:

a projection carried on the plunger and projecting laterally therefrom; and a guide member disposed beside the plunger and having a guide slot in which the projection is received, the guide slot having opposing first and second sides extending along the plunger between opposing ends of said slot, and a transition on the first side where the slot narrows between the opposing ends in a direction opposite the bias of the plunger into the normal position.

Preferably the second side of the slot extends linearly between the opposing ends of said slot.

Preferably there is provided an adjustment mechanism operable to set a distance travelled by the plunger in movement between the normal and depressed positions.

Preferably there is provided an adjustment mechanism operable to adjust a location in which the plunger resides when in the depressed position.

According to a second aspect of the invention there is provided a transmission brake control switch comprising:

a switch device operable to open and close a conductive path between connection points at which the switch is connectable in a control circuit of a transmission brake in a manner such that opening and closing of the conductive path switches the transmission brake between on and off states, the switch comprising a plunger supported for movement along an axis thereof between a normal position into which it is biased and a depressed position in which the transmission brake is in the on state; and an adjustment mechanism operable to set a distance traveled by the plunger in movement between the normal and depressed positions.

Preferably the adjustment mechanism comprises a stop member aligned with the plunger and adjustable in position along the axis of said plunger to set the depressed position thereof.

Preferably the stop member is a threaded member engaged with a matingly threaded support to move axially along the axis of the plunger under relative rotation between the threaded member and the threaded support.

According to a third aspect of the invention there is provided a method operating a transmission brake control switch operable to open and close a conductive path between connection points at which the switch is connected in a control circuit of a transmission brake in a manner such that opening and closing of the conductive path switches the transmission brake between on and off states, the method comprising:

(a) depressing a plunger of the switch along an axis thereof out of a biased normal position of said plunger, in which the transmission brake is in the off state;

(b) reaching an intermediate position of said plunger at which resistance to further depression of the plunger is met, and at which the transmission brake is in the on state; and (c) selecting from the options of:
 (i) releasing the plunger for biased return thereof to the normal position from the intermediate position; or
 (ii) depressing the plunger past the intermediate position to a further depressed position, in which the transmission brake remains in the on state, and subsequently releasing the plunger for biased return thereof to the normal position from the further depressed position;

whereby user control over a delay time from release of the plunger to disengagement of the transmission brake is attained by selecting between release from the intermediate position, resulting in a first length of plunger travel measured between the intermediate and normal positions, or release from the further depressed position, resulting in a greater second length of plunger travel measured between the further depressed and normal positions.

Preferably steps (a) and (b) comprise moving a lateral projection on the plunger along a side of a guide slot in a direction moving away from a first end of a guide slot toward an opposing second end of the guide slot, and recognizing the intermediate position of the plunger upon engagement of the pin against a transition at which the guide slot narrows moving toward the second end.

According to a fourth aspect of the invention there is provided a method adjusting a transmission brake control switch operable to open and close a conductive path between connection points at which the switch is connected in a control circuit of a transmission brake in a manner such that opening and closing of the conductive path switches the transmission brake between on and off states, the method comprising adjusting a travel length of a plunger of the switch in movement between a biased normal position of the switch, in which the transmission brake is in the off state, and a depressed position of the switch, in which the transmission brake is in the on state.

The method may comprise adjusting a position of a stop member against which the plunger abuts in the depressed position.

According to yet another aspect of the invention there is provided a transmission brake control switch for a vehicle, comprising a switch device operable to open and close a conductive path between transmission brake connection points at which the switch is connectable in a control circuit of a transmission brake in a manner such that opening and closing of the conductive path switches the transmission brake between on and off states, the switch comprising a plunger supported for movement along an axis thereof between a normal position into which it is biased, a first depressed position in which the transmission brake is continuously engaged in an on state, a second depressed position further from the normal position than the first depressed position and in which the transmission brake is at least intermittently disengaged from the on state, and a third depressed position further from the normal position than the second depressed position and in which the transmission brake is continuously engaged in the on state, whereby the switch is operable to hold the vehicle stationary through continuous engagement of the transmission brake when initially depressed to the first depressed position, allow creeping of the vehicle through at least intermittent disengagement of the transmission brake upon further depression to the second depressed position, and re-establish the continuous engagement of the transmission brake upon still further depression to the third depressed position to again hold the vehicle stationary.

According to yet another aspect of the invention there is provided a method operating a transmission brake control switch operable to open and close a conductive path between connection points at which the switch is connected in a control circuit of a transmission brake of a vehicle in a manner such that opening and closing of the conductive path switches the transmission brake between on and off states, the method comprising:

(a) depressing a plunger of the switch along an axis thereof out of a biased normal position of said plunger, in which the transmission brake is in the off state;

(b) reaching a first depressed position of said plunger, at which the transmission brake is in the on state;

(c) with the transmission brake held in the on state from step (b), applying wheel brake pressure to provide rotation resistance at one or both of front and rear wheels of the vehicle;

(d) while holding the wheel brake pressure from step (c), further depressing the plunger to a second depressed position of said plunger, at which the transmission brake is in the off state, and advancing the vehicle in a controlled manner against the rotation resistance provided by the wheel brake pressure;

(e) further depressing the plunger to a third depressed position of said plunger, at which the transmission brake is returned to the on state, and removing the brake pressure applied in step (c); and (f) with an engine of the vehicle revved, releasing the depressed plunger for biased return thereof to the normal position, thereby returning the transmission brake to the off state to allow the vehicle to propel forward.

According to yet a further aspect of the invention there is provided a method operating a transmission brake control switch operable to open and close a conductive path between connection points at which the switch is connected in a control circuit of a transmission brake of a vehicle in a manner such that opening and closing of the conductive path switches the transmission brake between on and off states, the method comprising:

(a) depressing a plunger of the switch along an axis thereof out of a biased normal position of said plunger, in which the transmission brake is in the off state;

(b) reaching a first depressed position of said plunger, at which the transmission brake is continuously held in the on state;

(c) further depressing the plunger to a second depressed position of said plunger, at which the transmission brake is pulsated to alternate back and forth between the on state and the off state, and advancing the vehicle in a controlled manner against intermittent motion resistance provided by the pulsating transmission brake;

(d) further depressing the plunger to a third depressed position of said plunger, at which the transmission brake is again held in the on state; and (e) with an engine of the vehicle revved, releasing the depressed plunger for biased return thereof to the normal position, thereby returning the transmission brake to the off state to allow the vehicle to propel forward.

BRIEF DESCRIPTION OF THE DRAWINGS

In the accompanying drawings, which illustrate exemplary embodiments of the present invention.

DETAILED DESCRIPTION OF THE INVENTION

The appended drawings show a differential delayed timing release switch 25 (DDTRS) that includes a push and release, spring loaded spool-type plunger 26 having a first end 11 and a second end 12. The plunger 26 includes a cam stepped segment 31 that progresses from a larger diameter 32 adjacent the first end 11 to a smaller diameter 33 and that allows a roller wheel 35 on the contact lever arm 35a of a microswitch 89 mounted beside the plunger to follow this cam profile of the plunger 26 to move toward and away from the contact 88 of microswitch 89. The lever arm is biased away from the contact 88 to remain in contact against the circumference of the plunger. When the lever arm engages the contact 88, a conductive path of the switch is closed to provide continuity between pin 3 and pin 4 of the microswitch 89, thereby closing a circuit to activate the transmission brake solenoid. When the roller 35 is on the smaller diameter portion 33 of the plunger, a gap exists between the lever arm and the contact 88, leaving the conductive path of the switch, and the circuit in which the switch is wired, open, and so the solenoid inactive and the transmission brake is off. When the roller is on the larger diameter portion 32 of the plunger, the lever arm is held against the contact 88, closing the conductive path and solenoid actuation circuit to activate the solenoid and the transmission brake.

Figure 1:
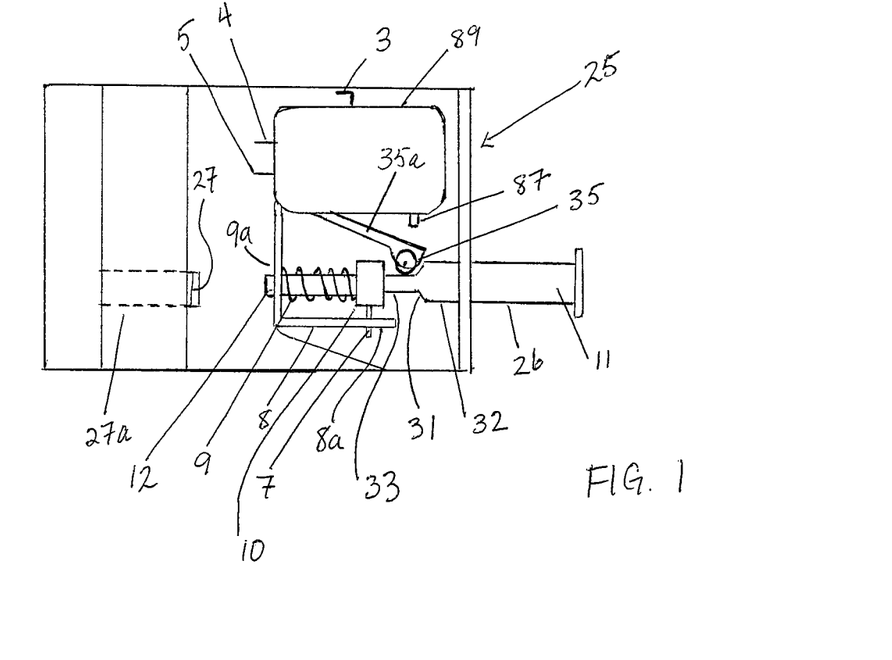
FIG. 1 is a top plan view of a first embodiment switch and plunger-type actuation mechanism of present invention
Figure 2:
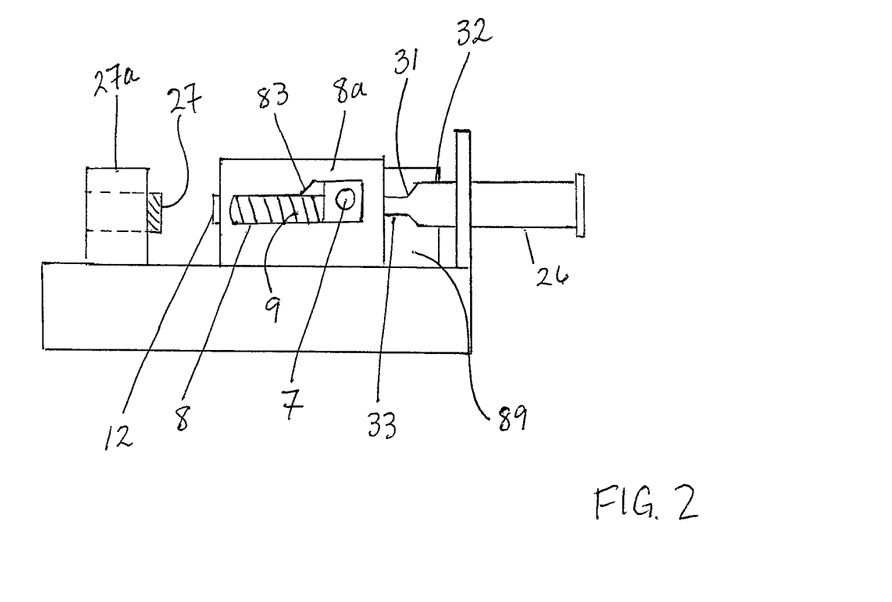
FIG. 2 is a side elevational view of switch and mechanism of FIG. 1 at rest position

FIGS. 1 and 2 show the plunger in a normal default position into which it is biased by a compression spring 9 disposed between a stop shoulder 10 of the plunger 26 and a wall 9a through which the plunger 26 extends. The wall is perpendicular to the plunger axis and located near the end of the switch where the contact lever arm 35a is pivoted on the switch body. The stop shoulder 10 is defined by a flange of the plunger 26 at an end of the smaller diameter portion 33 opposite the larger diameter portion 32. The spring resists compression thereof between the stop shoulder and wall, thereby biasing the spring in a direction moving the stop flange toward the roller-equipped free end of the contact arm 35a, which rolls the roller 35 off the large diameter portion 32 of the plunger into the recessed or smaller diameter portion 33 defined between the stop flange and the large diameter portion. This default condition of the switch opens the conductive path in the brake control circuit, thus defaulting the transmission brake to the off state. Depressing the plunger by pushing the large diameter end 11 thereof thus pushes the plunger along its longitudinal axis against the spring force, causing the relative movement of the roller 35 over the gradual transition 31 from the small diameter portion 33 to the large diameter portion 32, thereby closing the conductive path of the switch to close the control circuit and activate the brake. When the plunger is released from a depressed condition, the spring 9 forces it back the normal default position, thereby transitioning the roller of the switch's contact arm back to the small diameter portion of the plunger, and deactivating the brake. Accordingly, the amount of time between the release of the depressed plunger and the disengagement of the brake is determined by the stroke or travel length of the plunger between the point of the roller on the large diameter portion when the plunger is depressed, and the point at the transition 31 where the contact arm 35a leaves the contact 88.

The maximum stroke length of the plunger 26, i.e. the distance moved in travel between the normal default position and a fully depressed position, which determines the amount of time delay as described above, may typically be set to a dimension between, but not limited to, 0.020" to 3.100", for racing classes mandated to use switches meeting the current length limitations. For other classes that are not mandated to use an approved switch, the length could be increased beyond this range, for example up to 5.100 inches. The actual attainable stroke length of the plunger can be reduced from the maximum by adjustment of a threaded stop 27 embodied in the base of the DDTRS 25. The illustrated stop 27 is externally threaded and rotatably engaged in a threaded-bore of a support wall 27a spanning across the base of the DDTRS 25 at a distance from the spring-mounting wall 9a on the side thereof opposite the contact arm of the switch. The stop member axially aligns with the plunger, and rotation of the stop member in opposite directions in the threaded bore of the support wall 27a axially displaces the stop member toward and away from the nearest end 12 of the plunger 26 when biased into the default normal position. Accordingly, the threaded adjustable stop sets the stop point of the plunger 26 at full plunger travel (i.e. when fully depressed).

Figure 3:
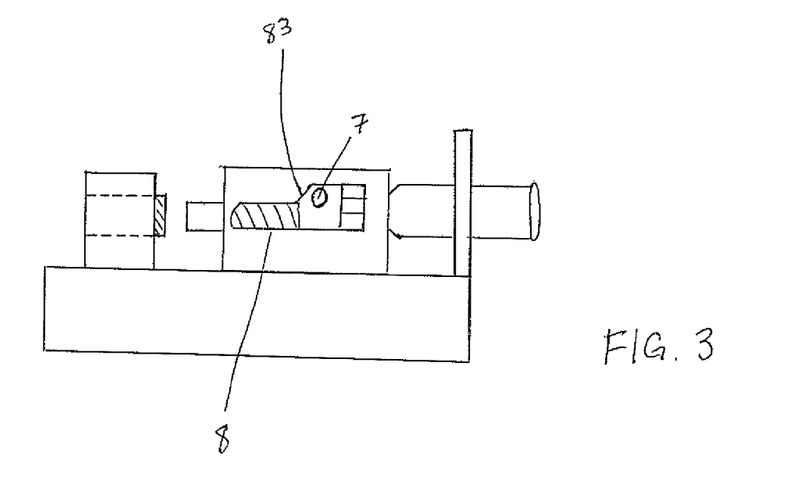
FIG. 3 is a side elevational view of switch and mechanism of FIG. 1 at Step 1 position
Figure 5:
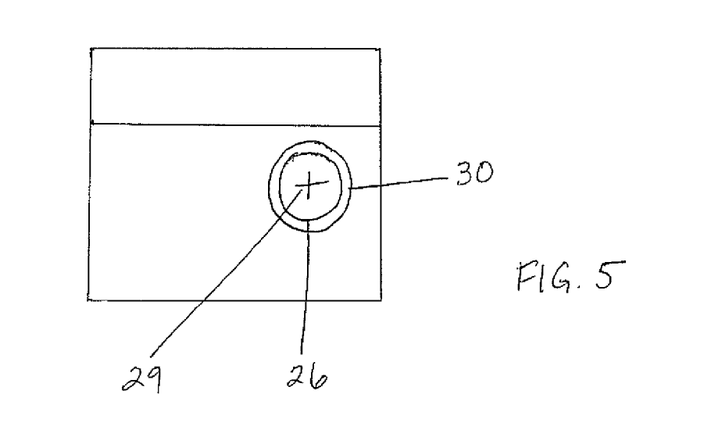
FIG. 5 is a front schematic view of the switch of FIG. 1.

The plunger 26 includes an alignment pin 7 that projects radially from the plunger in a lateral direction opposite the microswitch and slides within restraints of a guide slot 8 in a guide wall 8a that runs parallel to the plunger axis on the side thereof opposite the microswitch. The plunger 26 has the ability to be rotated on its axis 29 (FIG. 5) and the amount of allowable rotation is limited by the width of the guide slot 8 and alignment pin 7. Top and bottom sides of the slot run from one end of the slot to the other, and the top side of the slot features a sloped transition 83 at an intermediate position along this side, where this oblique sloping of the side between two linear sections causes a narrowing of the slot 8 in the direction opposite the spring bias of the plunger (i.e. in the same direction in which the plunger moves when depressed). The opposing bottom side of the slot is linear over its full length between the opposing ends of the slot 8. When the plunger 26 is manually rotated to place the pin 7 against the narrowing transition side of the slot, i.e. clockwise as viewed from the manually gripped large-diameter end in the illustrated embodiment, depressing the plunger will advance initially advance it as far as the transition 83 (step 1) as viewed in FIG. 3 due to alignment pin 7 being stopped or resisted by contact with this transition under its cam-action following along the upper side of the slot 8. Release of the plunger 26 from this intermediate position between the normal default position and a fully depressed position will result in a predetermined time of reaction delay between release of the plunger and disengagement of the brake.

Figure 4:
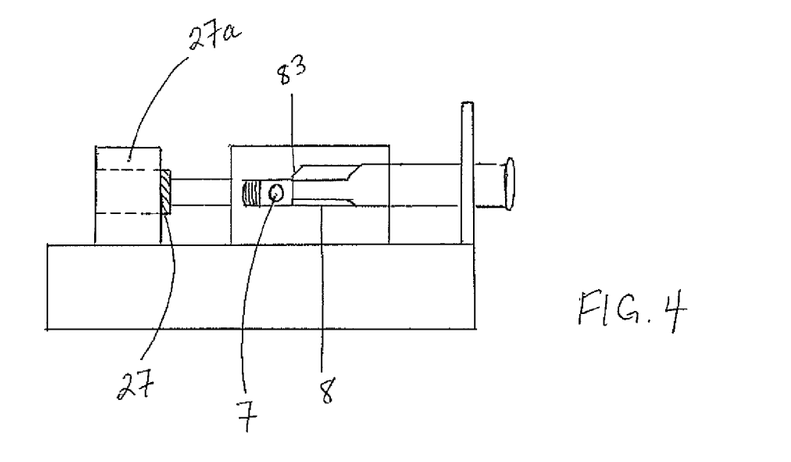
FIG. 4 is a side elevational view of switch and mechanism of FIG. 1 at step 2 position

In the event of a circumstance that dictates that the driver requires additional time of reaction delay, the driver needs only to push the plunger harder to overcome the resistance of the cam action against the a slot transition 83, which serves to automatically rotate the plunger 26 around axis 29 in the direction opposite that in which it was first manually rotated, which moves the alignment pin 7 down toward the straight bottom side of the guide slot to align with the narrowed portion thereof. Accordingly, the pin is then at a position in the guide slot 8 that allows additional travel of the plunger 26 up to step 2 (the fully depressed position), as viewed in FIG. 4, when the plunger end 12 comes in contact with threaded stop 27. The angle of the cam-action transition 83 can be changed to provide a suitable "feel" to the driver. The driver needs to "feel" that he has pushed up against a semi-rigid stop position (step 1), and the cam action 83 angle determines the amount of resistance required to push the plunger 26 further toward the fully depressed position (step 2). Having depressed the plunger to the intermediate position (step 1), the driver can thus recognize that the mechanism is set to provide a first predetermined delay time, and can choose whether to depress the plunger further to the fully depressed position in order to instead apply a second predetermined delay time of greater length. Having the bottom side of the slot straight with no angled transition portion ensures that there is no impedance of the alignment pin 7 during the spring-biased return of the plunger to the default normal position, thereby ensuring a consistently reliable travel distance and corresponding delay time for full depressions of the plunger for a given position of the adjustable stop member.

It is intended that various aspects of the DDTRS 25 can be configured and altered as desired to still provide an intermediate point of added resistance and/or adjustable allowable plunger travel without departing from the scope of the invention. Modifications of various aspects may include, without being limited to, changes to the plunger 26, profile 31, spring 9, size, strength, spring rate (being variable or constant), spring shoulder 10 position on plunger 26, lengths and positioning of guide slot 8, size, and length and position of alignment pin 7. It will be appreciated that the adjustable travel length of the plunger may be used with or without the cammed multi-stage plunger depression guide, and vice versa. Where the described pin and slot configuration is used to providing this multi-stage action, the position of the guide slot and which of its sides features the transition (which determines the required direction of plunger rotation to achieve the multi-stage action) may be varied. For example, the slot may be formed within the base of the apparatus instead of in a guide wall upstanding therefrom, with the alignment pin thus projecting radially downward, not laterally outward, into the slot.

Figure 6:
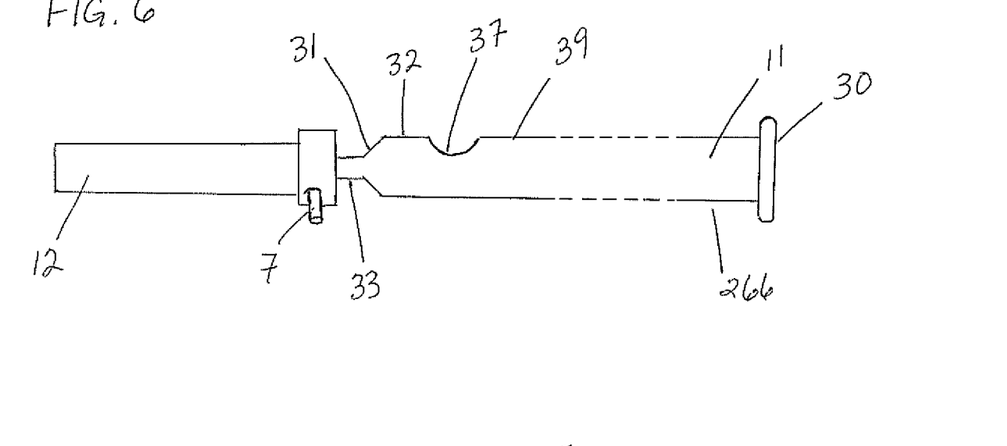
FIG. 6 is a side elevational view of a second embodiment plunger, which is a more complex profile than the first embodiment plunger of FIG. 1.
Figure 7:
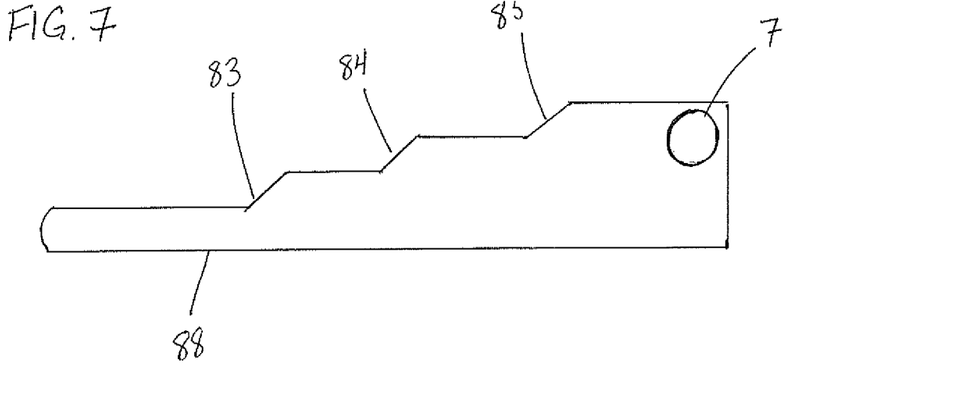
FIG. 7 is a side elevational view of a guide slot of the second embodiment, which is a more complex profile than the guide slot of the first embodiment.
Figure 8:
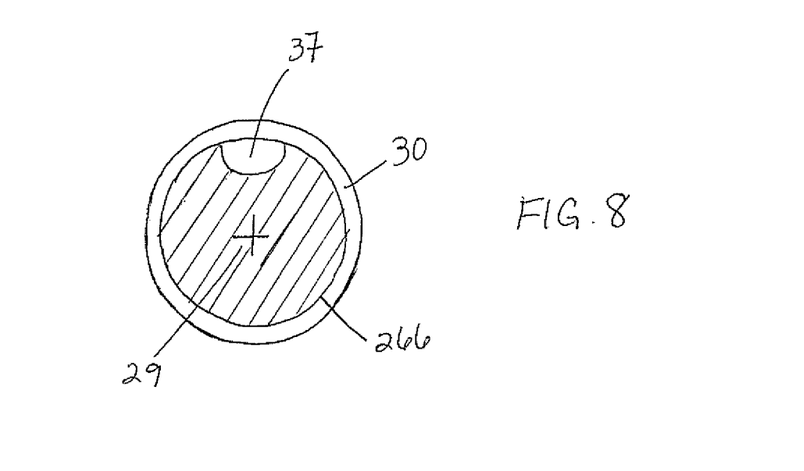
FIG. 8 is a cross sectional view of the second embodiment plunger as taken along line A-A of FIG. 6.

The following description applies to the second embodiment plunger 266 FIG. 6, which features a more complex profile than the plunger 26 of the first embodiment. That is, the plunger 26 and cooperating guide slot 8 can be altered and configured to provide additional functions over and above dual (two-stage) differential release timing and delay adjustability. Such a configuration may apply to, without being limited to, a staging aid as well as a dual differential release timing and delay adjustability. In such case the plunger 266 FIGS. 6, 7 and 8 would include additional detents 37 and flats 32, 39 and guide slot cam positions 84 and 85 to provide additional functions.

Figure 9:
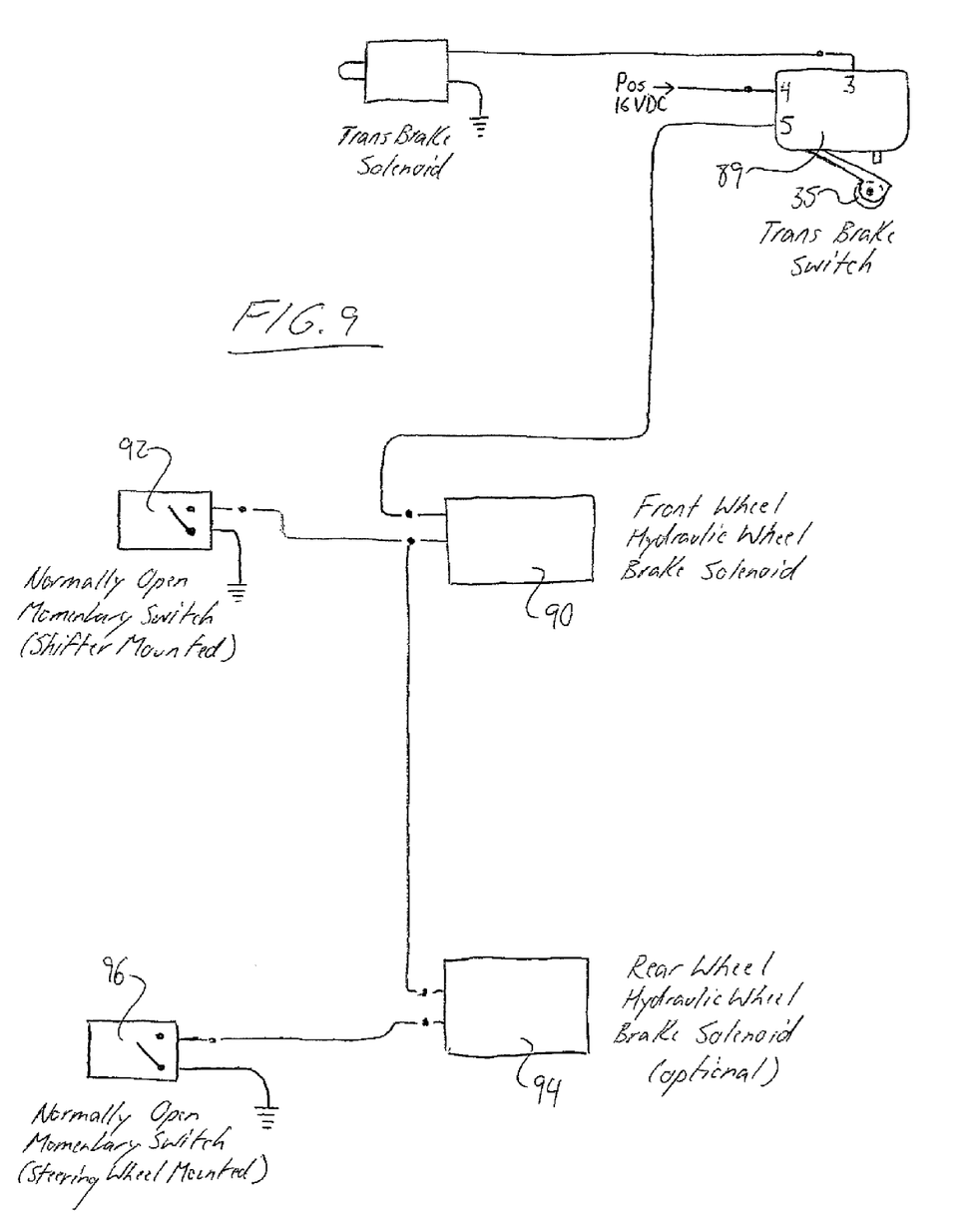
FIG. 9 is a schematic illustration of a first transmission brake control circuit having a control switch employing the second embodiment plunger.

In one example, with reference to FIGS. 6-9, the driver could activate the transmission brake by pushing the plunger 266 to move the pin 7 up to the first cam position 85 of the guide slot when he sees the prestage bulb, thereby bringing the roller 35 into a position resting on flat 32 to close the conductive path of the switch to engage the transmission brake. At that point the driver could apply conventional brake pedal pressure up to a suitable level of psi monitored on a gauge, or pressure-switch activated light, that would allow the car to be moved forward against a measurable quantity of resistance to rolling via the car's disc brakes. At that point, with this pedal controlled brake pressure applied, the driver would advance the plunger 266 to move the detent position 37 to the roller 35, which would automatically advance the alignment pin 7 to the next cam position 84 of guide slot 87 by rotating plunger 266 on axis 29. With reference to FIG. 9, this would break continuity between pins 3 & 4 of microswitch 89, thereby disengaging the transmission brake, and would provide continuity between pins 4 & 5 of microswitch 89, which, together with manual closing and holding of one or two normally open momentary switches, could activate (i.e. close) a solenoid shut-off valve that would lock and hold the hydraulic pressure in the car's hydraulic brake system to hold this pressure constant at one or both of the front and rear brakes according to the manually applied brake pedal pressure described above. For example, still referring to FIG. 9, a front wheel brake-locking solenoid 90 and a first normally open momentary switch 92 are wired in series, in this sequential order, between the pin 5 of the microswitch 89 and ground, while a rear wheel brake-locking solenoid 94 and a second normally open momentary switch 96 are wired in series, in this sequential order, to ground from a node between the front brake-locking solenoid 92 and first momentary switch 90, thereby placing the rear wheel brake-locking solenoid 94 and second momentary switch 96 in parallel with the first momentary switch 92. Accordingly, when pins 4 and 5 of the microswitch are in conductive continuity, i.e. when the transmission brake is off, pressing of either momentary switch 92, 96 will activate the respective brake-locking solenoid 90, 94 to close the hydraulic path between the master cylinder and the respective front or rear wheel brakes to lock the current brake pressure thereat until the switch 92, 96 is released or the continuity between pins 4 and 5 is broken. Where locking of either the front or rear brake pressure is sufficient provide the desired resistance to motion of the vehicle, the other solenoid and switch may be omitted. However, when the wheel brake-locking solenoids and respective momentary switches are wired according to the illustrated embodiment, depressing the second momentary switch 96 alone will cause both the front and rear wheel brake-locking solenoids to close.

At this point, with the hydraulic brake pressure locked to provide uniform resistance, the car could be moved forward at a slow and even rate that would allow the driver to stop the car precisely at the point where the front tire just breaks the beam and no further, the advantage being that the driver can consistently and precisely stage the car at the maximum rollout position. At this point, additional brake pedal pressure may be applied as the one or two brake-locking switches 92, 96 are released to stop the car with additional hydraulic brake pedal pressure. The driver can advance the plunger 266 to move the flat 39 position to the roller 35, which would automatically advance the pin 7 to the final cam position 83 of guide slot 87 by rotating plunger 266 on axis 29. This would simultaneously activate the transmission brake and deactivate the hydraulic brake system solenoid shut-off valve(s). The driver and car are thus in the staged position, and ready to release the plunger 266 back to its original default position in order to disengage the transmission brake and accelerate the vehicle down the track. As mentioned above, additional pedal generated hydraulic brake pressure may be applied over and above the solenoid-locked brake pressure while switching over to the trans-brake, for example by depressing the brake pedal while the hydraulic brake lines are still closed by the solenoid so that the additional pedal-generated pressure is applied to the wheel brakes as soon as the solenoid valve is opened. Alternatively, if the trans-brake engages quickly enough as the solenoid is deactivated, additional pedal-generated braking pressure may not be required during this transition.

As in the first embodiment, the driver has the option of depressing the plunger even further before release of the same in order to move the pin 7 past the final cam position 83 toward the end of the guide slot, thereby increasing the delay time from manual release of the plunger to the disengagement of the transmission brake.

Of note, in order to maintain a clean on-off transition of the transmissions brake through movement of the roller 35 from flat 39 to flat 33, the detent 37 spans less than 360 degrees of the plunger 266 circumference or outer diameter (OD) so as to be engaged by roller 35 in the angular position of the plunger corresponding to positioning of pin 7 at cam portion 84, but not be engaged by roller in the angular position of the plunger corresponding to positioning of pin 7 at cam portion 83 and beyond. Thereby the detent 37 would be avoided on release due to rotation of plunger 266 on axis 29 dictated by alignment pin 7 and guide slot 87. Also of note is additional advancement of the plunger 266 is still available to the driver past the final cam portion 83 on demand, just like it was in first embodiment of switch 25 (SSTRS). Additionally, one or more colored lights, preferably LED light sources, could be used to provide visual feedback on which cam position the switch is at for any given moment.

The particular wiring of the front and rear wheel brake locking solenoids in the illustrated embodiment is not only useful for being able to lock the brake pressure at all four wheels through a single switch, i.e. momentary switch 96, thereby leaving the other hand available for operation of the plunger during the creeping process, but also has the benefit of being able to lock only the front wheels through operation of only the other momentary switch 92. This is useful for the rear tire burnout process carried out before the staging process, where the front wheels are locked to hold the vehicle in place while the driven rear tires are spun in order to heat the tire through frictional contact with the ground.

Figure 10:
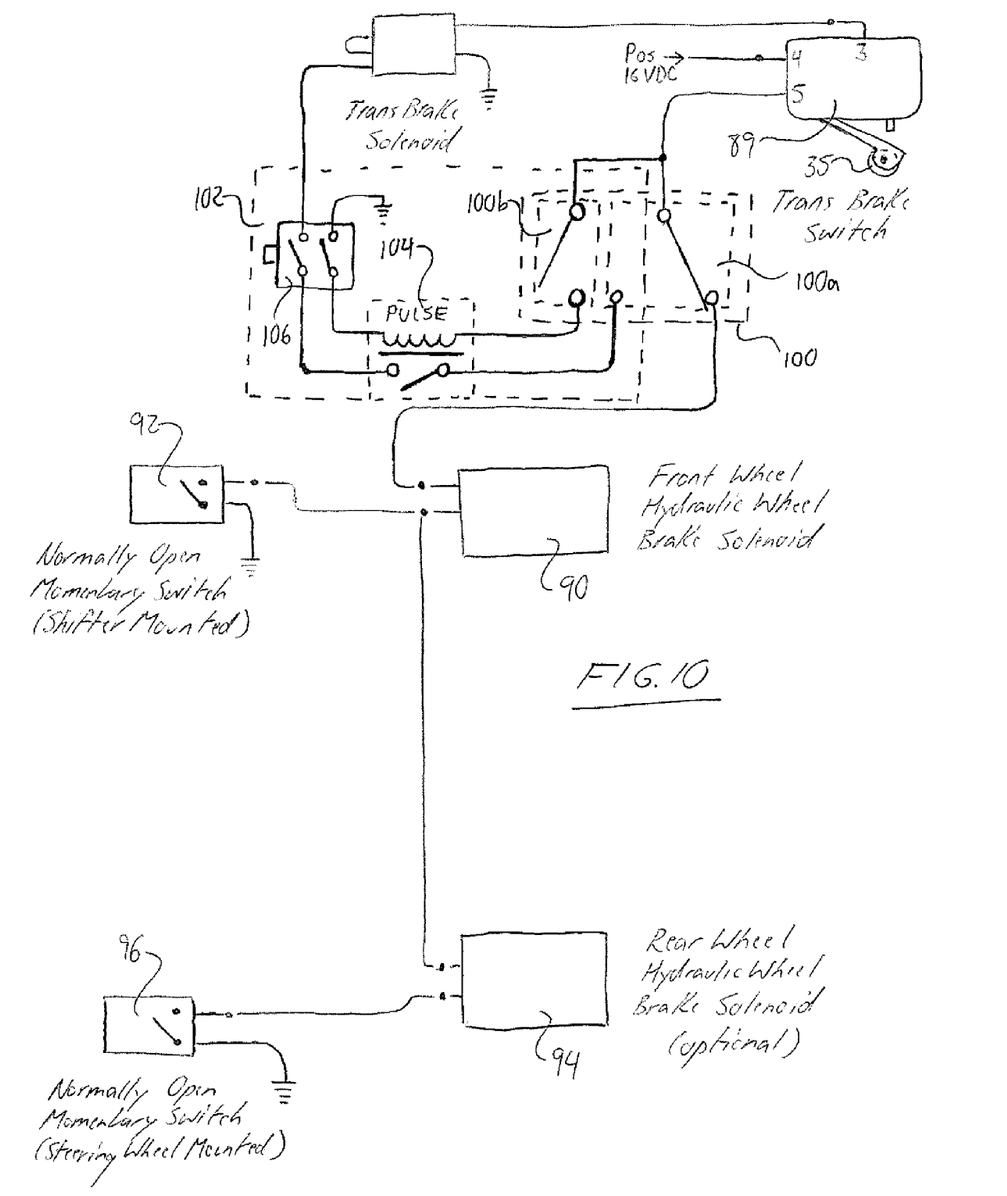
FIG. 10 is a schematic illustration of a second transmission brake control circuit having a control switch employing the second embodiment plunger.

Another example of use of the second embodiment plunger is described as follows with reference to FIGS. 6 to 8 and 10. FIG. 10 illustrates a control circuit similar to that of FIG. 9, but adding a double pole switch 100 having a double throw pole 100a inserted between the microswitch 89 and the front wheel brake-locking solenoid 90 in order to control operation of a pulsed-brake control 102 of the circuit, which is configured for operation of the transmission brake in a pulsing manner. A pulsing relay 104 has its contact terminals wired between one contact of the double throw pole 100a of the switch 100 and a third normally open momentary switch 106. The other terminal on the same pole of the third normally open momentary switch 106 is wired to the transmission brake solenoid. The other contact of the double throw pole 100a of the switch 100 is wired to the front wheel brake-locking solenoid 90, whereby the position of the double throw switch 100 determines whether pin 5 of the microswitch 89 is conductively connected to the front wheel brake-locking solenoid 90 or the control or coil side of the pulsing relay 104. The single throw pole 100b of the double pole switch 100 is wired to pin 5 of the microswitch in parallel with the double throw pole so that the power supply connected to pin 4 of the microswitch is conductively linked to the single throw pole 100b when pins 4 and 5 of the microswitch are in continuity with one another.

When connected to the power supply by closing of the single throw pole 100b of the double pole switch 100, the relay 104 is arranged to repeatedly cycle or pulse on and off, i.e. repeatedly open and close the contacts on switch side of the relay, thereby creating a cycling or pulsing effect on any current passing to the transmission brake solenoid through this part of the circuit, whereby the solenoid likewise cycles or pulses between on and off states. Known methods for achieving a repeating cycle output from a relay to achieve pulsing of the switch side circuit of the relay may be employed.

The circuit of FIG. 10 gives the user of option of either using pedal applied hydraulic pressure to creep the vehicle slowly forward when the plunger pin 7 is at cam position 84, as described above with reference to the control circuit of FIG. 9, or alternatively using a pulsing action of the transbrake to likewise provide a slow, carefully controlled creeping of the vehicle, where the vehicle will only advance when at 'off' stages of the pulsing relay cycle, and only by very small distances due to the short duration of each 'off' stage. The pulsing cycle may involve on and off stages ranging between 0.2 and 2.5 seconds, for example somewhere between 0.5 and 1.5 seconds in some embodiments, and the 'on' and 'off' times may be the same or different from another.

The selection between the hydraulically controlled creeping action through the wheel brakes and the electronically controlled creeping action through the pulsing of the transmission brake is achieved through the double pole switch 100. When the pulsing transmission brake option is selected, the process followed by the driver to creep the vehicle forward is similar to that described above for FIG. 9, except that the third momentary normally open momentary switch 106 (instead of the first, and optionally the second, momentary switch) is depressed while the plunger pin 7 resides at cam position 85, and held in this closed condition during transition of the plunger pin 7 from cam position 85 to cam position 84. This movement of the plunger pin brings pins 4 and 5 of the microswitch into continuity with one another, thereby connecting the switch side of the relay 104 to the trans brake solenoid in order to cause pulsing of the same.

The vehicle creeps forward under the pulsing of the trans brake solenoid, and when the driver wishes to the stop the vehicle, the plunger is depressed all the way in order to bring pins 3 and 4 of the microswitch into continuity with one another, thereby breaking continuity between pins 4 and 5 in order to disconnect both sides of the relay 104 from the power supply and cease the pulsing of the transmission brake, which returns the transmission brake to a continuously engaged, non-pulsing state. With the pulsing control part 102 of the circuit thus de-energized, the third momentary switch 106 can now be released. The driver and car are thus in the staged position, and ready to release the plunger 266 back to its original default position in order to disengage the transmission brake and accelerate the vehicle down the track.

As shown, the third normally open momentary switch 106 may be a double pole single throw (DPST) switch, with the second pole being wired between ground and the second terminal of the control side of the pulsing relay. This way, power is only provided to the pulsing relay when operation of the same is needed.

Figure 11:
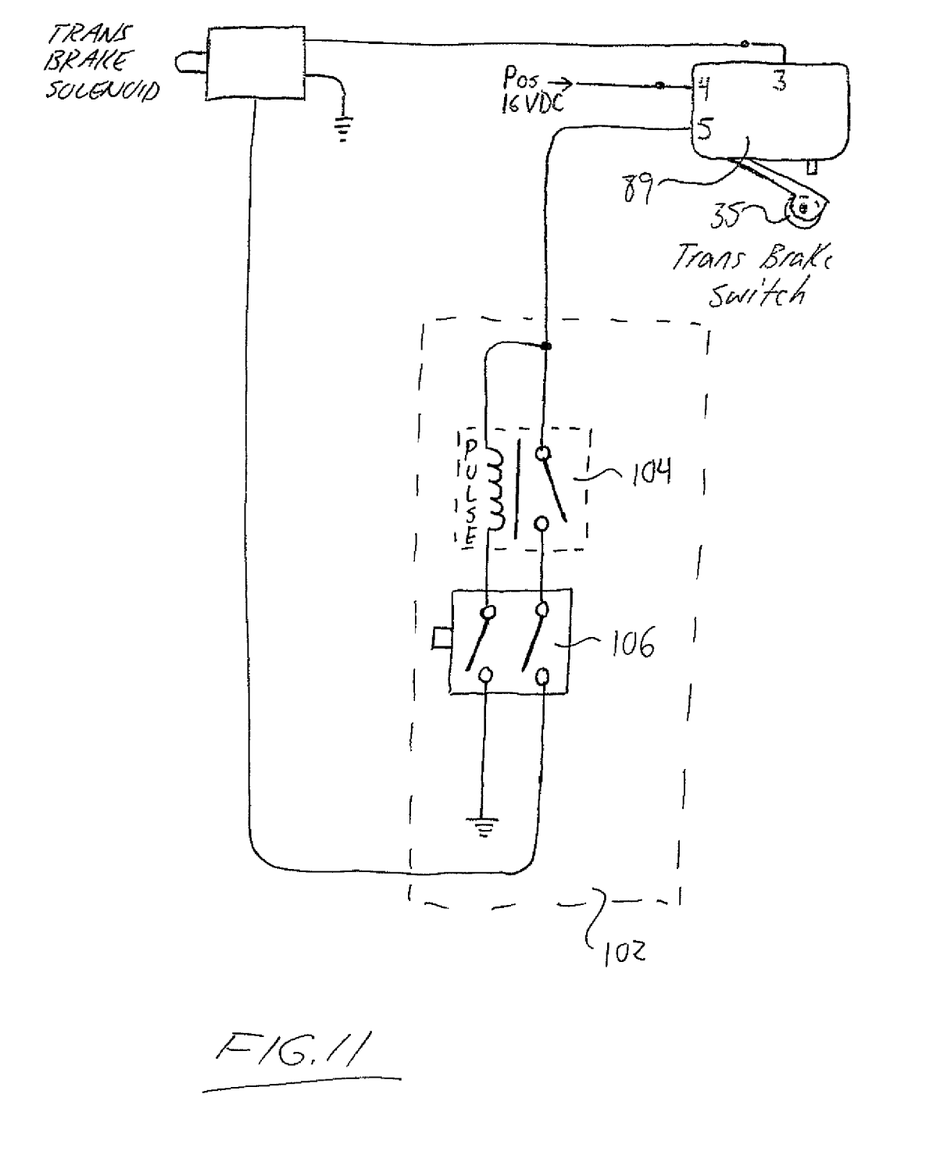
FIG. 11 is a schematic illustration of a third transmission brake control circuit having a control switch employing the second embodiment plunger.

A further variant of the control circuit is shown in FIG. 11, where the pulsing brake control is the only mechanism for creeping the vehicle forward, thus removing the double throw switch 100, first and second normally open momentary switches, 96, 96 and the front and rear wheel brake locking solenoids 90, 94 from the circuit of FIG. 10.

Of note is that there is a design benefit to the pulsating method for creeping the vehicle forward, which presents itself internally in the transmission reverse clutch cavity. Pulsating transmission reverse clutch application aids in ensuring that that the cavity holds and receives a full shot of oil just prior to final deep application of the trans brake at the 'ready to race' position. With race transmissions, it is typical to use minimal oil pump pressures in order to reduce the power to operate them, although its a fine line to walk, because if a full shot of oil at the point of final deep trans brake operation is not achieved, the car can move forward an inch or two after the trans brake has been applied, thus defeating the purpose of attempting to stage the vehicle in an exact location.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A transmission brake control switch comprising:
a switch device operable to open and close a conductive path between connection points at which the switch device is connectable in a control circuit of a transmission brake in a manner such that opening and closing of the conductive path switches the transmission brake between on and off states, the switch device comprising a plunger supported for movement along an axis thereof between a normal position into which it is biased and a depressed position in which the transmission brake is in the on state; and
a resistance mechanism operable to impede movement of the movement of the plunger toward the depressed position from the normal position upon reaching an intermediate position between the depressed and normal positions;
wherein the plunger is arranged to put the conductive path of the switch device into a same one of an open or closed state at the intermediate and depressed positions, and put the conductive path of the switch device into the other of the open or closed state at the normal position.

2. The transmission brake control switch of claim 1 wherein the switch device has a first contact element movable into and out of contact with a second contact element to open and close the conductive path, the first contact element is biased against the plunger in a direction moving the first contact element out of contact with the second contact element, and the plunger has a smaller diameter portion against which the first contact element abuts in the normal position and a larger diameter portion against which the first contact element abuts in the depressed position.

3. The transmission brake control switch of claim 2 wherein the plunger is rotatable about its axis and the resistance mechanism comprises:
a projection carried on the plunger and projecting laterally therefrom; and
a guide member disposed beside the plunger and having a guide slot in which the projection is received, the guide slot having opposing first and second sides extending along the plunger between opposing ends of said slot, and a transition at on the first side where the slot narrows between the opposing ends in a direction opposite the bias of the plunger into the normal position.

4. The transmission brake control switch of claim 3 wherein the second side of the slot extends linearly between the opposing ends of said slot.

5. The transmission brake control switch of claim 1 comprising an adjustment mechanism operable to set a distance travelled by the plunger in movement between the normal and depressed positions.

6. The transmission brake control switch of claim 5 wherein the adjustment mechanism comprises a stop member aligned with the plunger and adjustable in position along the axis of said plunger to set the depressed position thereof.

7. The transmission brake control switch of claim 6 wherein the stop member is a threaded member engaged with a matingly threaded support to move axially along the axis of the plunger under relative rotation between the threaded member and the threaded support.

8. The transmission brake control switch of claim 1 comprising an adjustment mechanism operable to adjust a location in which the plunger resides when in the depressed position.

9. The transmission brake control switch of claim 1 wherein the intermediate position of the plunger is a third one of a plurality of partially depressed positions that also comprise a first partially depressed position in which the transmission brake is continuously engaged in an on state, and a second partially depressed position located between the first partially depressed and third partially depressed positions and in which the transmission brake is at least intermittently disengaged from the on state, whereby the switch is operable to hold the vehicle stationary through continuous engagement of the transmission brake when initially depressed to the first partially depressed position, allow creeping of the vehicle through at least intermittent disengagement of the transmission brake upon further depression to the second partially depressed position, and re-establish the continuous engagement of the transmission brake upon still further depression to the intermediate position to again hold the vehicle stationary.

10. The transmission brake control switch of claim 9 wherein the switch device comprises an additional contact at which the switch device is connectable in a secondary brake control circuit.

11. The transmission brake control switch of claim 10 wherein the switch device is arranged to close a conductive path to the additional contact when the conductive path between the transmission brake connection points is open.

12. The transmission brake control switch of claim 10 in combination with the secondary brake control circuit, which is connected to the additional contact of the switch device and comprises a control circuit of a hydraulic wheel brake system.

13. The transmission brake control switch of claim 12 in combination with at least one electronically operated valve in the control circuit of the hydraulic wheel brake system that is operable to open and close hydraulic fluid passages to wheel brakes and that switches between operative and inoperative states according to an open or closed state of the conductive path to the additional contact.

14. The transmission brake control switch of claim 13 in combination with a momentary switch connected to the electronically operated valve to control opening and closing of the hydraulic fluid passages when the electronically operated valve is in the operative state.

15. The transmission brake control switch of claim 10 in combination with the secondary brake control circuit, which is connected to the additional contact of the switch device and comprises a pulse generating control circuit operably linked to the transmission brake to effect repeated pulsing thereof between on and off states.

16. The transmission brake control switch of claim 9 wherein the resistance mechanism is operable to impede movement of the movement of the plunger from the first partially depressed position to the second partially depressed position, and from the second partially depressed position to the third partially depressed position to provide user-feedback on a current position of the plunger.

17. The transmission brake control switch of claim 16 wherein the switch device has a first contact element movable into and out of contact with a second contact element to open and close the conductive path, the first contact element is biased against the plunger in a direction moving the first contact element out of contact with the second contact element, and the plunger has smaller diameter portions against which the first contact element abuts in the normal position and second partially depressed positions, and larger diameters portions against which the first contact element abuts in the first and third partially depressed positions.

18. The transmission brake control switch of claim 17 wherein the plunger is rotatable about its axis and a respective one of the smaller diameter portions against which the first contact element abuts in the second partially depressed position comprise a recess in a periphery of the plunger that spans only a partial circumference of the plunger at said respective one of the smaller diameter portions, whereby rotation of the plunger into an orientation with a non-recessed portion of the circumference at the respective one of the smaller diameter portions of the plunger allows return of the plunger from the third partially depressed position to the normal position without breaking contact between the first and second contact elements as the plunger moves through the second depressed position.

19. A transmission brake control switch comprising a switch device operable to open and close a conductive path between transmission brake connection points at which the switch device is connectable in a control circuit of a transmission brake in a manner such that opening and closing of the conductive path switches the transmission brake between on and off states, the switch device comprising a plunger supported for movement along an axis thereof between a normal position into which it is biased, a first depressed position in which the transmission brake is continuously engaged in an on state, a second depressed position further from the normal position than the first depressed position and in which the transmission brake is at least intermittently disengaged from the on state, and a third depressed position further from the normal position than the second depressed position and in which the transmission brake continuously engaged in the on state, whereby the switch device is operable to hold the vehicle stationary through continuous engagement of the transmission brake when initially depressed to the first partially depressed position, allow creeping of the vehicle through at least intermittent disengagement of the transmission brake upon further depression to the second partially depressed position, and re-establish the continuous engagement of the transmission brake upon still further depression to the intermediate position to again hold the vehicle stationary.

\* \* \* \* \*